SPEECH BANDWIDTH COMPRESSION SYSTEM

Filed April 29, 1959 3 Sheets-Sheet 1

INVENTOR.
WILLIAM C. DERSCH
BY Walter J. Madden, Jr.
ATTORNEY

May 21, 1963 W. C. DERSCH 3,090,837

SPEECH BANDWIDTH COMPRESSION SYSTEM

Filed April 29, 1959 3 Sheets-Sheet 3

3,090,837

SPEECH BANDWIDTH COMPRESSION SYSTEM

William C. Dersch, Los Gatos, Calif., assignor to International Business Machines Corporation, New York, N.Y., a corporation of New York Filed Apr. 29, 1959, Ser. No. 809,694
5 Claims. (Cl. 179—15.55)

This invention relates in general to bandwidth compression systems and relates more particularly to apparatus for reducing the frequency bandwidth required for the transmission of voice messages.

The desirability of reducing the frequency bandwidth in the transmission of information-containing signals has long been recognized, particularly in the transmission of human voice messages where the total frequency range of the human voice considerably exceeds the frequency range which is required to accurately describe the information being conveyed by the voice. Most bandwidth compression systems represent a compromise between the desire to obtain maximum economy in equipment for a given voice channel, and the necessity of retaining the intelligibility of the transmitted speech. The degree of quality of the reconstructed speech may vary in dependence upon the particular application of the technique. For example, in telephone communication it is necessary for obvious reasons to retain the identity of the speaker, so that the quality of transmission must be relatively high, whereas in other applications, such as military communications, retention of speaker identity is not necessary or, in some cases, even desirable.

One approach which has been utilized in bandwidth compression involves filtering the original input speech wave into a plurality of different frequency bands, and deriving two control signals from each of the different frequency bands. One of the control signals represents the frequency of the principal component of the speech energy passing through the subband filter, while the other control signal is a measure of the amplitude or power of the speech. These control currents, which together require much narrower transmission bands than the voice signals from which they are derived, are transmitted to a receiver station where they contol the operation of artificial voice-synthesizing apparatus. The voice-synthesizing apparatus includes a "buzz" source and a "hiss" source to represent voiced sounds and unvoiced sounds, respectively. The outputs of these buzz and hiss sources are supplied to a network where they are modulated by the frequency and amplitude control signals in accordance with the characteristics of the input speech. The output currents from this latter network are combined electrically and the resulting composite signal is converted into audible sound by suitable reproducing means.

Broadly, the present invention contemplates apparatus for bandwidth compression of speech in which the human voice is synthesized at the receiver end of the apparatus by means including a novel type of noise generator. The noise output of the generators of the present invention represents the sounds of actual human speech in different frequency ranges corresponding to the frequency ranges of a plurality of subband filters in the speech input end. The use of human speech as the modulated noise in recreating the input speech adds a great deal of naturalness to the recreated speech, as compared to the use of "hiss" and "buzz" noise sources, and permits the use of smaller bandwidths for the transmission of the control signals while still retaining the intelligibility of the recreated speech.

The output signals of the noise generators in the different frequency subbands are supplied to the variable filter means which are controlled by frequency control signals derived from the original input speech. Each of the variable filters is assigned a frequency sub-band corresponding to the subband of the input end, and each of the filters is operable to pass a narrow band of its associated voice noise signal within the assigned frequency band. For example, a given variable filter may be assigned a frequency range of from 100 to 200 cycles, and the filter is operable under control of the frequency control signal to select and pass a 20 cycle channel out of the assigned major range of 100 to 200 cycles. Thus, the voice noise signals from the noise generators are variably filtered in the variable filter networks under the control of the frequency control signals generated in response to the original input speech. The output signals from the variable filters are then passed to power or amplitude modulating networks where the power or amplitude of the signal is modulated in accordance with amplitude control signals derived from the original input speech. After this modulation, the signals from the different power modulating networks are combined to form a composite signal which is supplied to a reproducer for reproducing the original speech.

In accordance with one feature of the present invention, I have found that it is possible to assign one series of bandwidths for the power information and a different series of bandwidths for the frequency information, so that the power information and frequency information do not necessarily coincide in their frequency bandwidths. This feature is based on the fact that there is no reason to believe that the information content in the power and the information content in the frequency are uniformly distributed throughout the speech spectrum, or further, that the areas of maximum power information coincide with the areas of maximum frequency information.

It is therefore an object of the present invention to provide improved apparatus for reducing the channel bandwidth required for transmission of speech currents.

It is an additional object of the present invention to provide apparatus for bandwidth compression of speech messages in which a plurality of control signals are derived from the speech message, and these control signals are utilized to modulate the outputs of a plurality of voice noise generators whose outputs represent speech currents in different frequency subbands, and the modulated outputs of the voice noise generators are combined to recreate the original input speech.

It is a further object of the present invention to provide apparatus for bandwidth compression of speech messages in which a first plurality of control currents are derived from the speech message to describe the frequency characteristics of the speech in one group of frequency bands, and a second plurality of control currents are derived from the speech message to describe the amplitude variations of the speech within a second group of frequency bands which may be different from the first group of frequency bands.

Other objects of the invention will be pointed out in the following description and claims and illustrated in the accompanying drawings which disclose, by way of example, the principle of the invention and the best mode which has been contemplated of applying that principle.

Figure 1:
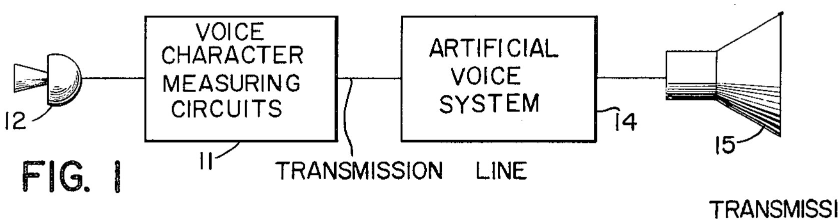
FIG. 1 is a block schematic diagram illustrating a system for bandwidth compression including a transmitter for measuring the characteristics of the speech and deriving the control signals therefrom, a transmission line for the transmission of the control signals, and the artificial voice system for recreating the original speech on the basis of the transmitted control signals.

Referring to FIG. 1, reference charatcer 11 designates the voice characteristic measuring circuits for deriving control signals from a voice input from a device such as a microphone or telephone mouthpiece 12. The frequency and amplitude characteristics of the speech currents from device 12 are measured in apparatus 11, and the control currents derived from this measuring may be transmitted by means of a transmission line 13 to an artificial voice system 14 for recreating the original speech on the basis of the transmitted control signals. The output from the artificial voice system 14 is supplied to a reproducer device such as a loud speaker 15 for recreating the input speech.

Figure 2:
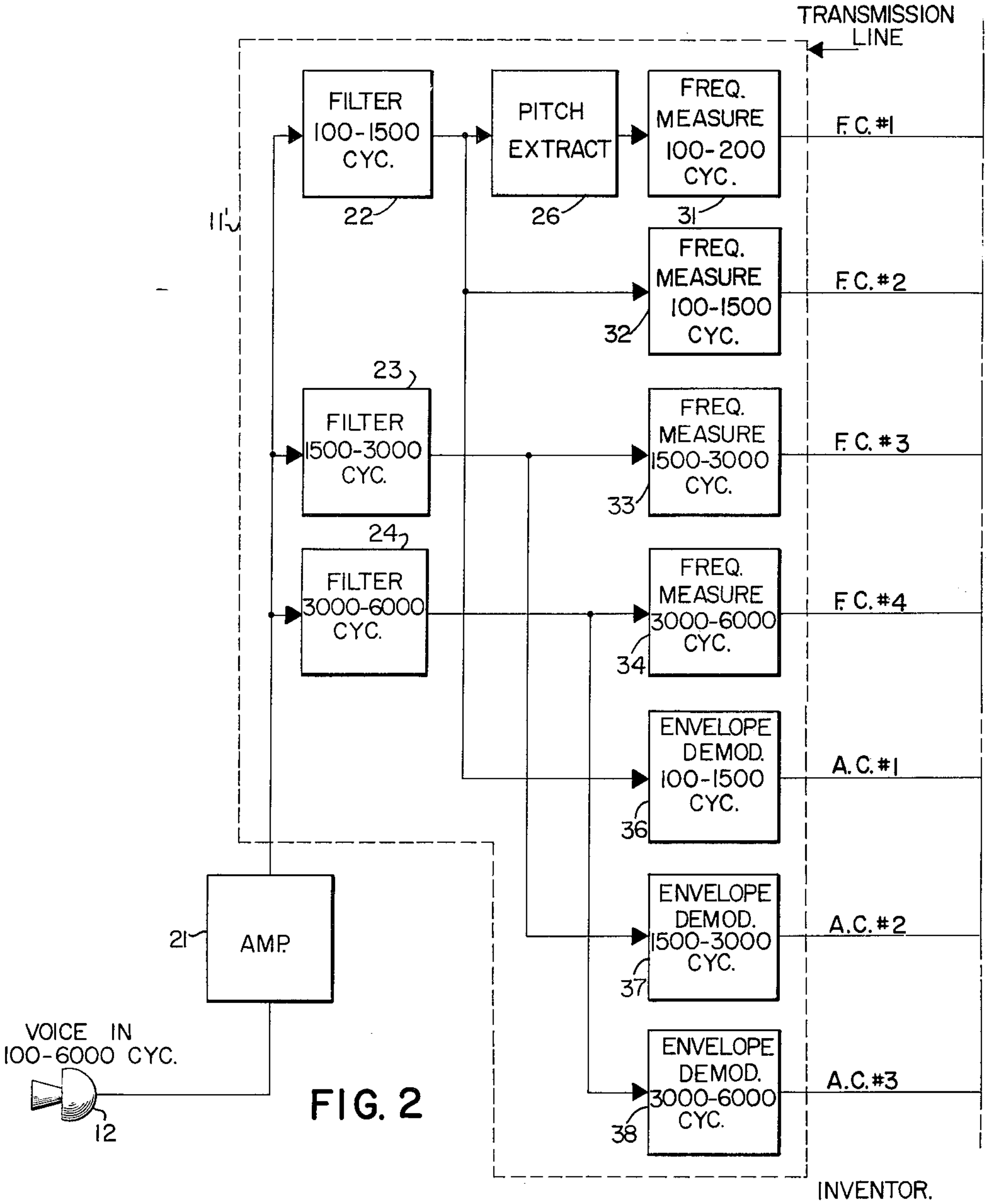
FIG. 2 is a block schematic diagram illustrating the details of the voice characteristic measuring circuits of FIG. 1.

Referring now to FIG. 2, which shows the details of the voice characteristic measuring circuits, the speech currents from input device 12 are supplied through an amplifier 21 to the parallel inputs of a plurality of bandpass filters 22, 23 and 24 having different pass bands within the speech current spectrum. In the illustrated embodiment, it is assumed that the speech input to the system has a frequency range from 100 to 6,000 cycles per second, which is a representative range for human speech. Accordingly, the bandpass filter 22 has a passband from 100 to 1,500 cycles, filter 23 has a pass band from 1,500 to 3,000 cycles, and filter 24 has a pass band from 3,000 to 6,000 cycles, thus effectively dividing the input speech current among the three filters.

The output from filter 22 is supplied to the input of a pitch extracting network 26. The function of pitch extractor 26 is to receive the signal from filter 22 and extract therefrom the fundamental component of pitch. Network 26 may be of any suitable type which is operative to extract the pitch from the speech, and numerous such devices and networks are available in the art. However, pitch extractor 26 is preferably of the type in which the signal representing the voiced part of the speech wave is half-wave rectified and then envelope demodulated so that the resultant wave contains a strong fundamental which corresponds exactly to the pitch of the speech. This low audio frequency envelope may then be filtered through a sharp-cutoff, low-pass filter which produces an output wave which is a good approximation of a sine wave.

Figures 4, 5:
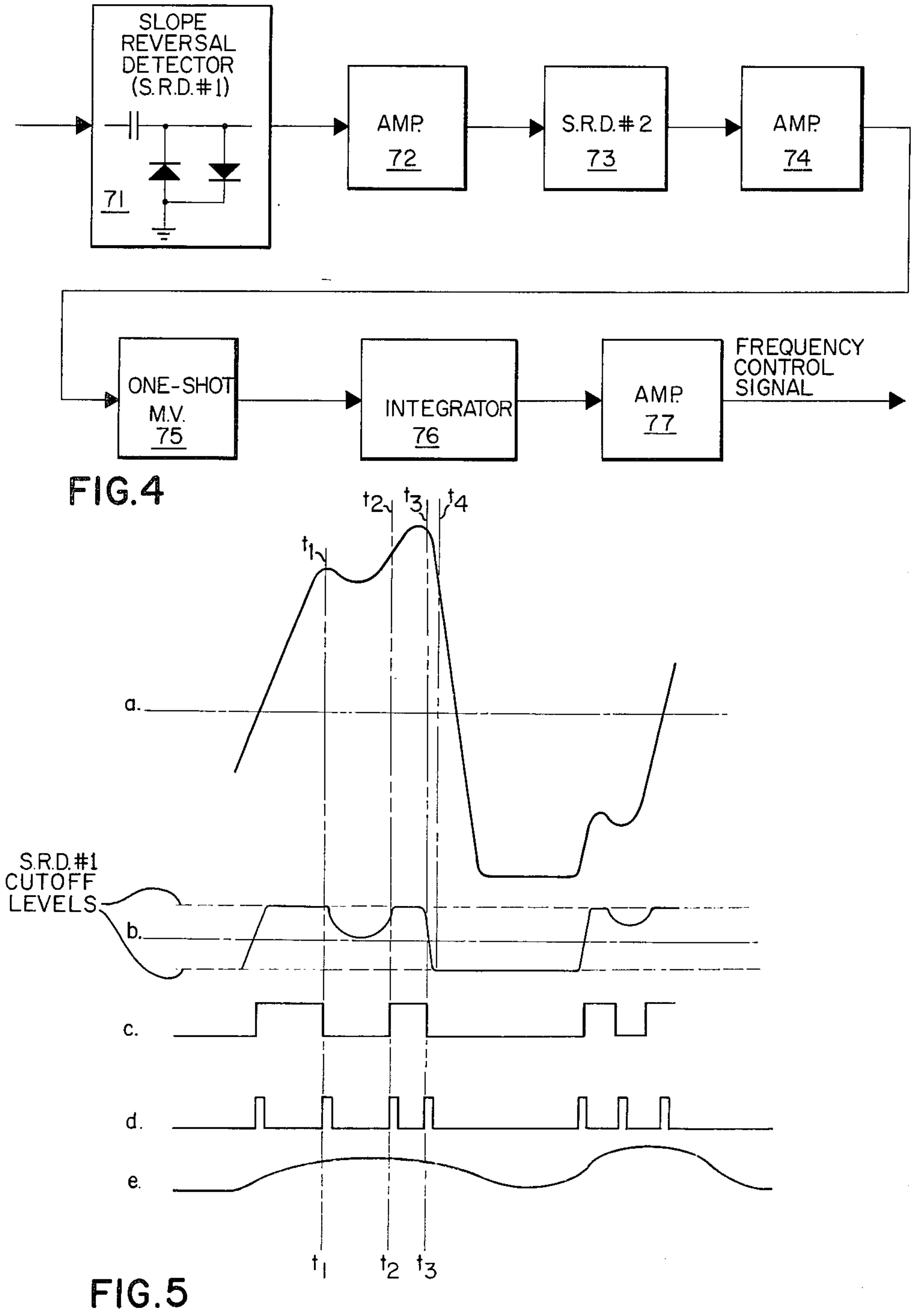
FIG. 4 is a schematic diagram of one embodiment of apparatus for deriving frequency control signals from the speech input.
FIG. 5 is a timing diagram illustarting the operation of the circuitry of FIG. 4 on a representative speech current wave.

The output signal from pitch extractor network 26 describing the pitch of the speech is supplied to a frequency measuring network 31 where the frequency of the pitch signal is measured to produce a frequency control signal. Network 31 is preferably a frequency-to-voltage converter which senses the slope reversals of the incoming audio signal from pitch extractor 26 to generate a slowly varying voltage which is proportional to the average number of reversals of the incoming signal in about a 50 millisecond interval. The details of a frequency measuring network 31 suitable for use in the present invention are shown in FIG. 4, and a timing diagram resulting from operation of the circuitry of FIG. 4 on a representative signal is shown in the curves of FIG. 5. As shown in FIG. 4 an input signal whose frequency is to be measured is supplied to a slope reversal detecting network 71. Slope reversal detector 71 utilizes a pair of reversely connected diodes, as indicated schematically, which follow the input signal only to a predetermined amplitude level on either side of zero and then effectively short-circuit this signal until a slope reversal in the signal occurs.

This relationship is indicated in the curve of FIG. *5b* which shows the slope reversal detector output signal following the input signal of curve *5a* to a predetermined voltage level and then leveling off at this level while the input signal continues to rise. When the input signal undergoes a slope reversal, as indicated at time $t_1$ slope reversal detector 71 undergoes a corresponding decrease in output level at the same time. The output level of the slope reversal detector follows the reversal of the input signal during the interval from time $t_1$ to $t_2$ and then cuts off at its cutoff level as the input signal rises after time $t_2$. At time $t_3$ the slope of the input signal again reverses, and this produces a corresponding reversal in the output of the slope reversal detector network. Slope reversal detector network 71 then follows the input signal in going from a positive value through zero to a negative maximum, with network 71 cutting off again at its negative maximum at time $t_4$. From the curves of FIG. *5a* and *5b* it will be seen that network 71 continues to follow the slope reversal of the input signal to produce an output signal which corresponds to the slope reversals.

The output from slope reversal network 71 is supplied through an amplifier 72 to a second slope reversal detector network 73, Slope reversal detector network 73 operates on the amplified signal from network 71 to follow the slope reversals thereof. As shown by the curve of FIG. *5c*, the output signal of slope reversal detector network 73 represents the slope reversals of the amplified output from network 71, and this signal is supplied through an amplifier 74 to a one-shot multivibrator 75. Mutlivibrator 75 may be constructed by techniques well known in the art to produce a train of positive-going pulses when energized by the input signal of FIG. *5c*. Network 75 thus produces a positive output pulse for each of the slope reversals of the signal from network 73 to produce an output pulse train as shown in curve *5d*. This output pulse train from network 75 is supplied to an integrating network 76 where the pulse train is integrated to produce a slowly varying D.-C. signal whose amplitude is a close measure of the frequency of the input signal to device 71. This signal is amplified in an amplifier 77 and supplied as the output signal from the frequency measuring network.

The slope reversal sensing circuit is insensitive to wide amplitude variations in the incoming signal, so that it measures only frequency and is not affected by variations in the amplitude of the incoming signal. Thus, any sustained frequency within the frequency range assigned to the measuring circuit 31 will cause a D.-C. signal voltage to exist proportional to the incoming frequency. The amplitude or power level of the incoming signal to network 31 can be varied by as much as 40 decibels without appreciably affecting the level of the output signal. The output from frequency measuring network 31 is thus a control signal which has an amplitude proportional to the frequency of its input signal, and the output of network 31 may be determined by the frequency control signal (F.C.) #1, as indicated in FIG. 2.

The output from filter 22, in addition to being supplied to the pitch extracting network 26, is also supplied to a frequency measuring network 32 which is assigned the frequency range from 100 to 1,500 cycles in the speech wave. Frequency measuring network 32 may be identical to network 31 except for nominal change in circuit constants and operates to produce an output signal having an amplitude level proportional to the frequency of its input signal. The output signal from frequency measuring network 32 may be labeled F.C. #2, as indicated in FIG. 2. The output signal from bandpass filter 23 is supplied to the input of its corresponding frequency measuring network 33 which produces an output signal, F.C. #3, whose amplitude is proportional to the frequency of the input signal. Similarly, the 3,000–6,000 cycle bandpass filter 24 supplies an input signal to a frequency measuring network 34 which produces an output signal, F.C. #4, whose amplitude is a measure of the frequency of the input signal to network 34. Thus, there are produced four frequency control signals which are derived from the original input speech and which are a measure of the frequency content of this input speech within the assigned bandwidths. The first frequency control signal, that from frequency measuring network 31, is a measure of the frequency of the predominant pitch of the voiced speech, and the other three frequency control signals have amplitudes representing the frequencies within their assigned bandwidths.

In addition to the above described frequency control signals, the present invention provides for generation of a plurality of amplitude or power control signals which are derived from the input speech and which are a measure of the power in the speech within different bandwidths. These amplitude control signals may be generated by any suitable means, such as by a plurality of envelope demodulating networks 36, 37 and 38. Demodulator 36 is connected to the output of bandpass filter 22 in parallel with pitch extractor 26 and frequency measuring network 32. Similarly, demodulator 37 is connected to the output of bandpass filter 23 in parallel with frequency measuring network 33, while demodulator 38 is connected to the output of bandpass filter 24 in parallel with the frequency measuring network 34. Demodulators 36, 37 and 38 measure the power in the speech supplied thereto from their associated filters, and operate to generate a curve describing this measured power averaged over about a 50 millisecond interval. The outputs of the envelope demodulators represent amplitude control signals describing the power in the input speech in the different frequency bandwidths assigned to the demodulators. These output control signals are labeled amplitude control (A.C.) #1, A.C. #2 and A.C. #3.

Thus, there are produced four frequency control signals and three amplitude control signals which in combination describe the characteristics of the input speech. These control signals may be supplied to a suitable transmission line for transmission to a receiver where the speech is to be recreated. Since the transmission line forms no part of the present invention, only a schematic transmission system 13 is shown. However, in connection with the bandwidth requirements for the transmission line, it will be noted that, utilizing the assumed intervals of approximately 50 milliseconds for both the frequency and amplitude measuring circuits, each of the frequency and amplitude control signals derived from the original speech will have a bandwidth of 20 cycles per second or less, thus producing a total bandwidth for the seven control signals of 140 cycles per second. Assume that seven conventional transmission channels are selected for transmission of the seven frequency control signals, and assume that each of these channels has a bandwidth of 3,000 cycles. Since any one channel of the control signals of the bandwidth compressor of the present invention occupies only 20 cycles, each of the seven channels of the transmission line may now carry 105 voice sub-channels, or 15 times the original capacity of the line for regular voice transmission.

Figure 3:
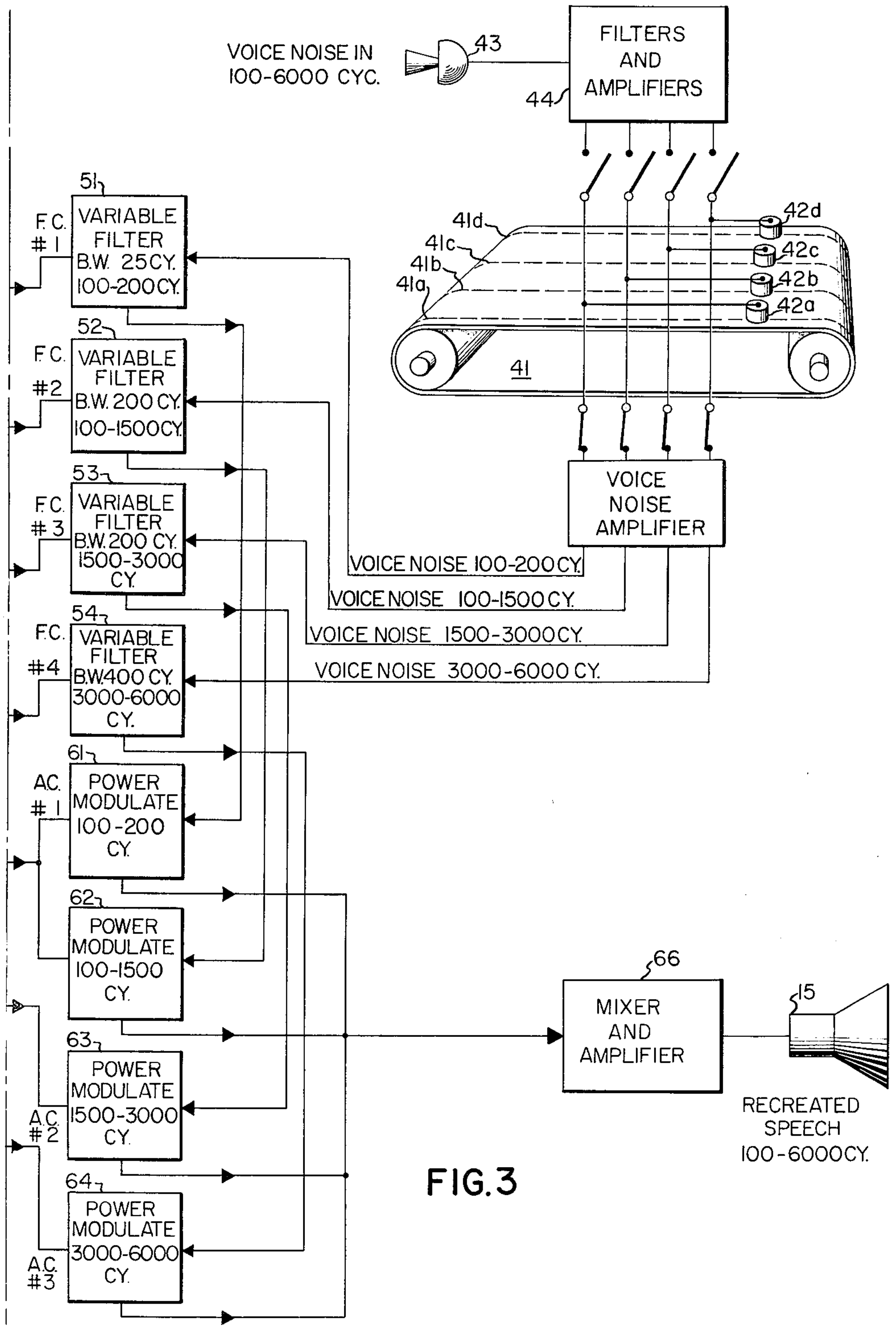
FIG. 3 is a block schematic diagram illustrating the details of the artifical voice system for recreating the speech on the basis of the transmitted control signals.

The receiver portion of the present invention which comprises an artificial voice mechanism is illustrated in block schematic form in FIG. 3. Basically, the artificial voice mechanism of the present invention involves a plurality of variable filters which are supplied with input voltages in the form of voice noise signals. These voice noise signals are frequency modulated in the variable filters under the control of the frequency control signals derived from the original input speech. The outputs of the variable filter networks are then supplied to a plurality of power modulating networks where the signals are amplitude modulated by the amplitude control signals derived from the original input speech. The outputs of the power modulating networks are combined and the resultant composite signal is supplied to a reproducer for recreating the original input speech.

The voice noise generators are an extremely important part of the present invention, and one form of such generators may include a magnetic recording medium in the form of an endless loop or belt 41. In the illustrated embodiment, recording medium 41 is provided with four record tracks **41*a*, 41*b*, 41*c* and 41*d* which have recorded thereon four separate noise tracks corresponding to voice noise in different frequency ranges. Such voice noise preferably is produced by applying human voice signals in the different frequency ranges desired to a plurality of recording heads 42*a*, 42*b*, 42*c* and 42*d*. Such human voice signals may be supplied from a microphone 43 through a network 44 which amplifies the incoming signal and filters the signal into the four desired subbands. In the illustrated embodiment the voice noise input is separated by network 44 into four bands corresponding generally to the frequency bands utilized in the transmitting apparatus illustrated in FIG. 2. That is, recording track 41*a* contains voice noise in the range from 100 to 200 cycles, track 41*b* contains voice noise in the range from 100 to 1,500 cycles, track 41*c* contains voice noise in the range from 1,500 to 3,000 cycles, and track 41*d* contains voice noise in the range from 3,000 to 6,000 cycles. Preferably, the voice noise on each of the tracks is reasonably homogeneous. Because of the peculiar nature of voice pitch, sine wave frequencies between 100–200 cycles preferably are additionally superimposed on the voice noise track 41*a*** (pitch track).

Once the voice noise has been recorded on the different channels, it may be continuously reproduced and supplied to the associated variable filters which are shown schematically at 51, 52, 53 and 54. These variable filter means may be of any suitable type in which the bandpass of the filter is subject to control by an incoming voltage signal. Preferably, these filters are of the type disclosed in my Patent No. 3,017,586 issued on January 16, 1962, and copendant with the instant case which discloses a variable filter which is a "twin T" configuration filter with amplified negative feedback from the output to the input. This "twin T" filter configuration used by itself is a very sharp band-rejection filter, but by utilizing the above feedback from the output to the input, the resultant effect is a filter having a pass band in the band which was formerly rejected. To control the pass band of the filter, the resistance of a resistive network in the filter network is changed under the control of the frequency control signals. This control may be effected through the use of relays which are actuated by variations in the magnitude of the frequency control signal to effectively switch different values of resistance into the different portions of the filter circuit to effectively change the pass band. The filter constants will thus change in steps under the control of the incoming frequency control signals and the number of discrete steps used will determine the smoothness of the resulting control.

Variable filters 51, 52, 53 and 54 are operative to selectively pass a narrow bandwidth within an assigned wider bandwidth, under control of the 20 cycle frequency control signals supplied as the control inputs of these filters. The pitch filter 51 is assigned a major frequency range of from 100 to 200 cycles, and this filter is operative to select a 25 cycle channel out of the assigned major channel of from 100 to 200 cycles under control of the frequency control signal #1. Similarly, filter 52 is assigned the major frequency range of from 100 to 1,500 cycles and is operative under control signal #2 to select a 200 cycle channel out of this major frequency range. Further, variable filter 53 is assigned the major frequency range from 1,500 to 3,000 cycles and has a bandwidth of 200 cycles, while variable filter 54 is assigned the frequency range from 3,000 cycles to 6,000 cycles and has a bandwidth of 400 cycles. When no frequency control signal is present, the associated variable filter is cut off so that no voice noise is transmitted therethrough.

The variable filters thus select, out of the voice noise inputs, a variable frequency portion thereof in response to variations in the frequency control signals supplied to the filters to effectively vary the portion of the voice noise which is passed through the filters in response to variations in the frequency control signals. It will be obvious from the above description that the frequency control signals supplied to the variable filters cause these filters to select and pass from the noise signals those noises which are similar to the sounds in the original voice which were used to generate the frequency control signals.

The output signals from the variable filters 51 through 54 are supplied as inputs to a plurality of power modulating networks 61, 62, 63 and 64. Power modulators 61 through 64 are under control of the amplitude control signals derived from the original input speech, as shown by the inputs to the power modulating networks in FIG. 3. It will be noticed that power modulators 61 and 62 are under the common control of the amplitude control signal #1. This is an example of the noncoincidence between a frequency channel and a power channel control referred to above. The amplitudes of the outputs of power modulators 61 through 64 are thus controlled in these networks in response to variations in the amplitude control signals. The power modulated outputs from modulating networks 61 through 64 are supplied in common to a mixer-amplifier network 66 where the signals are mixed to produce a resultant composite signal which is supplied to reproducer 15.

From the above, it will be seen that the voice noise signals are first frequency modulated in the variable filter networks in response to variations in the frequency control signals, and these frequency modulated signals from the variable filter networks are then amplitude modulated in power modulators 61 through 64 in response to variations in the amplitude control signals. The resultant composite signal from mixer network 66 will thus be an audio frequency signal having substantially the same frequency range as the voice input at the transmitter, and this audio signal is reproduced in reproducer 15.

The operation of the invention to recreate at a distant location a reasonable facsimile of the original input speech at the transmitter, should be readily apparent from the above description. Broadly, the original input speech to microphone 12 is broken down into three major frequency ranges by filters 22, 23 and 24 and the signals from these three filters are supplied to frequency measuring networks which produce frequency control signals whose amplitudes are an instantaneous measure of the frequency of the speech currents in the assigned bandwidths. The output from filter 22 is also supplied to pitch extractor 26 which, in conjunction with frequency measuring network 31, produces a frequency control signal describing the variations in pitch of the spoken voice. Simultaneously with the above generation of the frequency control signals, the outputs from the three filters are supplied to envelope demodulators which produce amplitude control signals having amplitudes which are an instantaneous measure of the power or amplitude of the input speech in the different frequency ranges.

Each of the control signals in the illustrated embodiment occupy a bandwidth of approximately 20 cycles, resulting in a total bandwidth for the seven control signals of 140 cycles. These control signals in a bandwidth of 140 cycles are then transmitted over the transmission line to the receiving location. At the receiver, the frequency control signals control the pass bands of a plurality of variable filters to frequency modulate a plurality of voice noise signals which represent human speech in different frequency ranges. These frequency modulated outputs from the variable filters are then supplied as the modulated input to a plurality of power modulating networks which are under the control of the amplitude control signals. In these networks the amplitude of the input signals is modulated in response to variations in the power of the original input speech. The resultant frequency modulated, amplitude modulated audio signals, having a frequency range approximately equal to the original input speech, are then mixed to produce a resultant audio signal for driving suitable reproducing means.

In connection with the reconstruction of the vowel sounds in the speech, it will be seen that the pitch channel, i.e., the 100–200 cycle channel, gives the pitch to the vowel, while the second channel, i.e., 100–1500 cycles gives the characteristic sound of the vowel. The vowel sounds are thus very simply reconstructed under the control of the two frequency control signals. It should also be noted that the sound of the speech is determined by the characteristics of the artificial voice system at the receiving end of the apparatus. Thus variations in speech rate, enunciation, and accents will be transmitted through the system but the voice timbre will be the same for all speakers. The system described is particularly adaptable for use with common male voices and should respond to most male voices. To obtain maximum intelligibility for the system in response to female speaking voices, the appropriate filter constants would be changed and the voice noise generators would contain some or all noise from a female speaking voice.

Apparatus for transmitting and receiving compressed bandwidth speech was constructed substantially as illustrated in the drawings utilizing the following components. The input filters 22, 23 and 24 were SKL #302 filters; the pitch extractor network 26 was a network as described above; frequency measuring networks 31, 32, 33 and 34 were as shown in the schematic diagram of FIG. 4; the variable filter networks 51, 52, 53 and 54 were those disclosed in my Patent No. 3,017,586 issued on January 16, 1962, and copendant with the instant case; the recording device for recording and reproducing the voice noise was a modified Viking tape disk #75; the input network 44 from the voice noise pickup 43 included an SKL #302 filter in conjunction with a Viking read/write amplifier #RP–61; and the voice noise reproduced from recording medium 41 was amplified through four Nortronics playback amplifiers #PL 100. The voice noise supplied as an input to the voice noise generator was a male voice speaking sounds which varied from an "*sh*" as in "shut" to the "*ss*" in "hiss." The highest frequency voice noise track had these sounds themselves, while the next highest track had mostly the overtones of the spoken vowel sounds. The next track had the mid-range vowel sounds thereon, and the lowest track had low frequency noise, corresponding to pitch. A panel of listeners was able to identify words and speech reconstructed by the above listed and described apparatus.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for the artificial production of speech comprising means for analyzing a speech current to derive therefrom a plurality of amplitude control signals which are individually representative of the amplitude of said speech in a plurality of different frequency ranges, means for deriving from said speech current a plurality of frequency control signals which are individually representative of the frequency of said speech in a plurality of different frequency ranges, a voice noise generator for generating a plurality of voice noise signals having the same characteristics as said speech current in a plurality of different frequency ranges, means for selectively passing a variable portion of said voice noise signals in response to variations in said frequency control signals, means for modulating the power of the passed part of said portion of said noise signals in response to variations in said amplitude control signals, and means for combining said frequency modulated, power modulated signals to produce a composite audio signal for the recreation of said speech.

2. Apparatus in accordance with claim 1 in which the frequency ranges for said frequency control signals are different from the frequency ranges for said amplitude control signals.

3. Apparatus for the artificial production of speech comprising means for analyzing a speech current to derive therefrom a plurality of amplitude control signals which are individually representative of the amplitude of said speech in a plurality of different frequency ranges, means for deriving from said speech current a plurality of frequency control signals which are individually representative of the frequency of said speech in a plurality of different frequency ranges, a voice noise generator for generating a plurality of voice noise signals having the same characteristics as said speech current in said plurality of different frequency ranges, a plurality of variable filters which are operable to pass a variable band of frequencies within a larger band of frequencies of an input signal in response to variations in a control signal, means for supplying said voice noise signals as the input signals to said filters, means for supplying said frequency control signals as t he control signals to said filters to shift the frequency of the portion of said noise signals passed by said variable filters in response to variations in said frequency control signals, means for modulating the power of said band of frequencies from said variable filters in response to variations in said amplitude control signals, and means for combining said frequency modulated, power modulated signals to produce a composite audio signal for the recreation of said speech.

4. Apparatus for comprising and expanding the frequency bandwidth of a speech current comprising means for dividing said speech current into a plurality of signals having different bandwidths, means for determining the frequency variations of said signals within each of said bandwidths to produce a plurality of frequency control signals, means for determining the power variations of said signals within each of said bandwidths to produce a plurality of amplitude control signals, means for transmitting said plurality of frequency control signals and amplitude control signals to a receiving location, a plurality of noise generators, each of said noise generators producing within a different frequency bandwidth a noise signal having the same characteristics as said speech current, a plurality of variable filters, each of said filters being operable to pass a band of frequencies of predetermined width within a wider frequency band, said predetermined band being shiftable within said wider band in response to variations in a control signal, means for supplying each of said noise signals to the corresponding one of said variable filters, means for supplying each of said frequency control signals to the corresponding one of said variable filters to control the portion of the associated noise signal passed through said filter, a plurality of power modulators, means for supplying the output signals from said variable filters to said power modulators, means for modulating the amplitude of said output signals in said power modulators in response to said amplitude control signals, and means for combining the output signals from said power modulators to produce a composite audio signal for recreating said original speech.

5. A speech synthesizing system of the bandwidth compression type including:

a plurality of bandwidth filter means responsive to the input speech wave for segregating said wave into frequency bands;

a plurality of frequency detection means responsive to said filter means for providing a signal representative of the occurrence of a narrowly attenuated bandwidth of frequencies;

vocal noise generating means for generating a plurality of predetermined noise signals having the characteristic of human speech at predetermined frequency ranges;

variable filter means responsive to the signals from said frequency detectors arranged at the output of said plurality of noise generating means so as to gate appropriate noise frequencies corresponding to the occurrence of these frequencies in the sampled speech wave and thereby generate an artificial speech wave having components representative of frequency bands occurring in the sampled input speech wave;

a plurality of amplitude detection means responsive to said bandwidth filter means to generate amplitude control signals;

power modulation means responsive to said amplitude detection means arranged at the output of said gating filter means so as to modulate the power of said standard predetermined noise signals at each of said frequency bands so as to reflect the power distribution of the sample speech wave; and speech output means for combining said frequency-power modulated signals to produce a composite audio signal for the creation of an artificial speech analog to said input speech wave.

References Cited in the file of this patent

UNITED STATES PATENTS

| | | |
|---|---|---|
| 2,151,091 | Dudley | Mar. 21, 1939 |
| 2,183,248 | Reisz | Dec. 12, 1939 |
| 2,243,089 | Dudley | May 27, 1941 |
| 2,908,761 | Raisbeck | Oct. 13, 1959 |